Feb. 23, 1971     A. SCHENFELD     3,566,275
OUTPUT SPLITTING CIRCUIT USING FERRITE ISOLATORS
AND D-C FEEDTHROUGH
Filed April 30, 1968     2 Sheets-Sheet 1
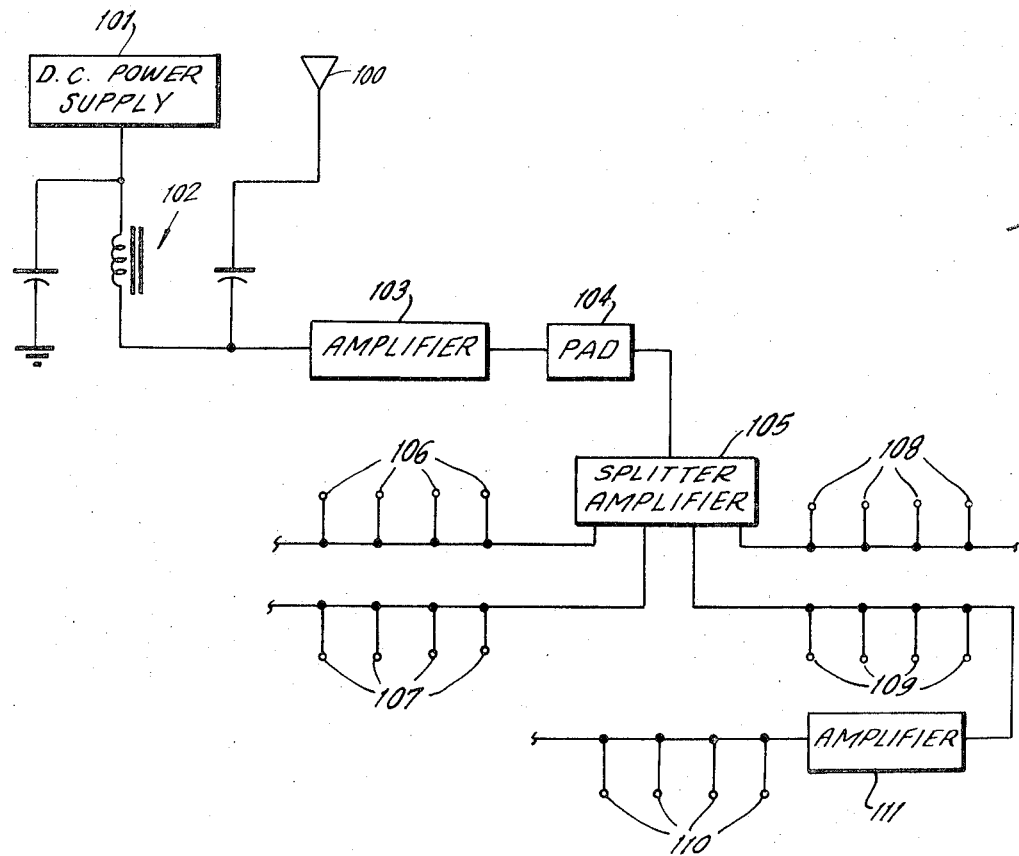
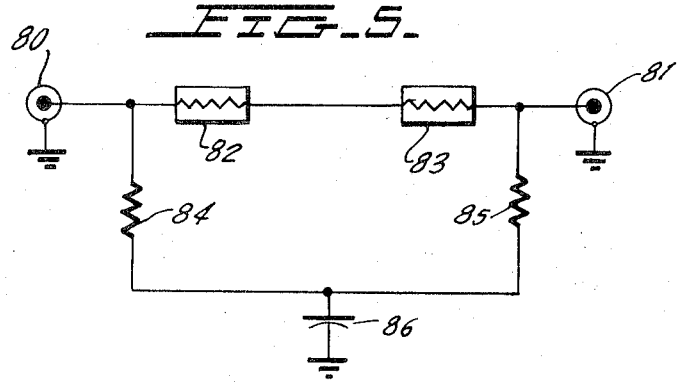
INVENTOR.
ABRAHAM SCHENFELD
BY
OSTROLENK, FABER, GERB & SOFFEN
ATTORNEYS

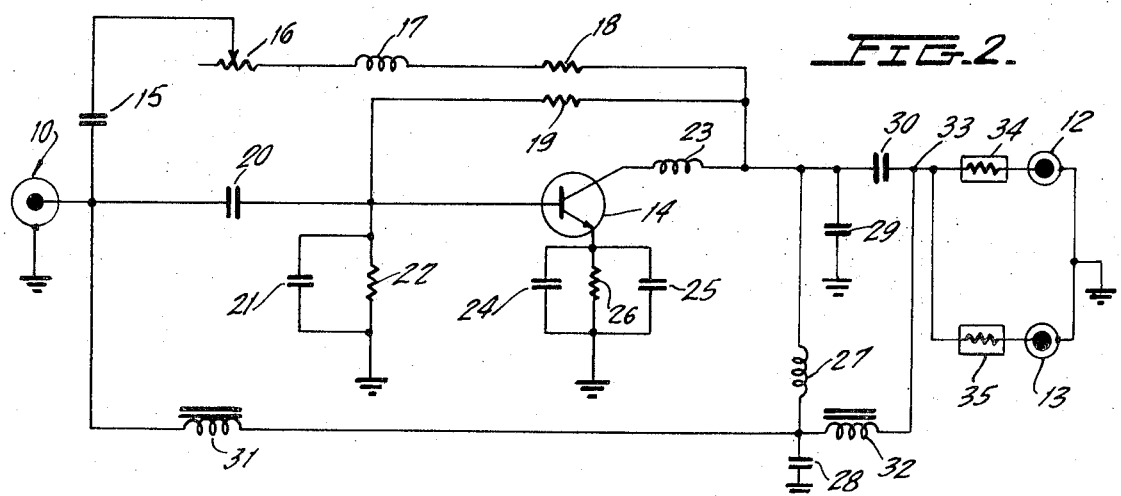
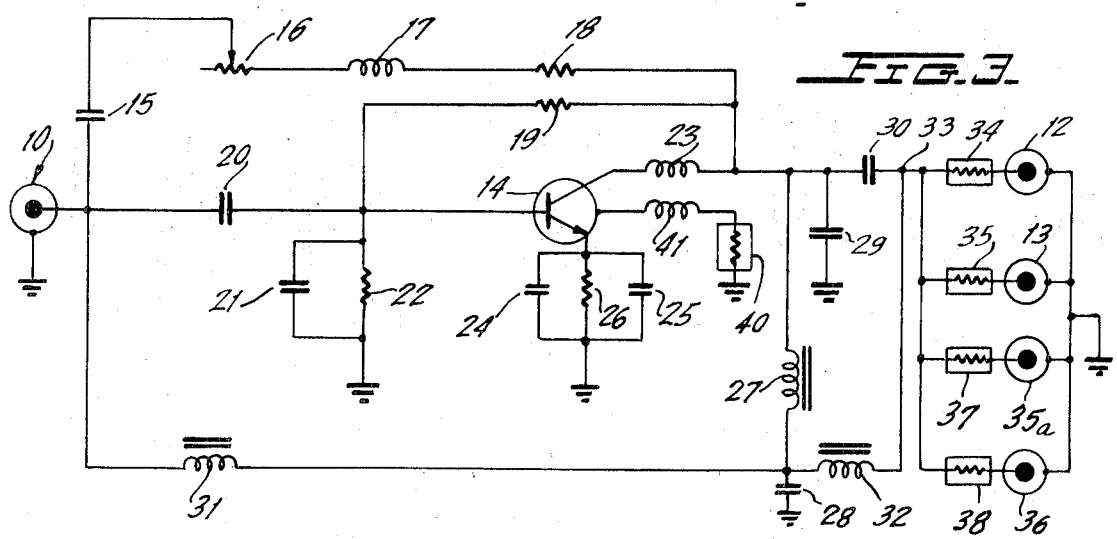
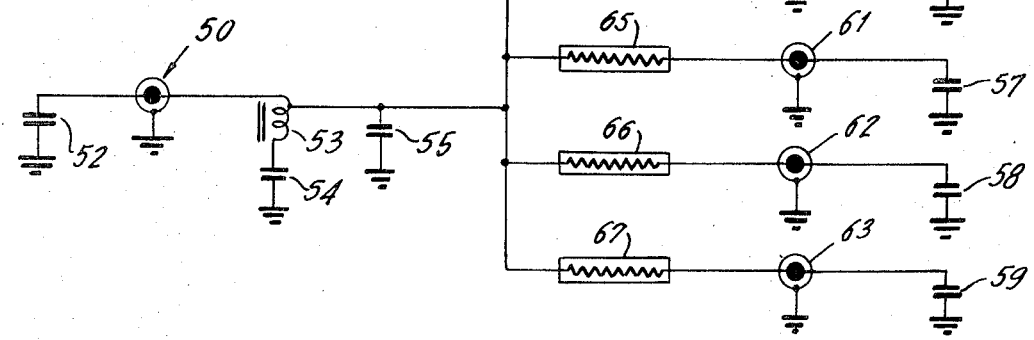

United States Patent Office

3,566,275
Patented Feb. 23, 1971

3,566,275
OUTPUT SPLITTING CIRCUIT USING FERRITE ISOLATORS AND D-C FEEDTHROUGH
Abraham Schenfeld, New York, N.Y., assignor, by mesne assignments, to JFD Electronics Corporation, Brooklyn, N.Y., a corporation of Delaware
Filed Apr. 30, 1968, Ser. No. 725,462
Int. Cl. H01f 17/06; H04b 3/02; H04n 7/10
U.S. Cl. 325—308                    12 Claims

ABSTRACT OF THE DISCLOSURE

A radio frequency signal superimposed on D-C power is connected to a common terminal of a plurality of output circuits which are each terminated with a respective connection terminal. Each of the output circuits contain a ferrite resistor which exhibits substantially zero resistance to the D-C power which can be transmitted to each of the output terminals and offers a relatively high resistance to the R.F. signals connected to each line which isolates the individual circuits from one another.

---

This invention relates to a signal-splitting circuit, and more particularly relates to a novel signal-splitting circuit which permits transmission of D-C power as well as R.F. signals from a common input location and through the plurality of output circuits with R.F. isolation between the circuits.

The need for output splitting circuits commonly arises in master antenna systems in which a common VHF-UHF antenna receives input signals which are to be distributed to a large number of output locations throughout a building. For example, a plurality of terminal connection locations may be provided throughout a building which are to make the R.F. signal and D-C power locally available. These circuits, however, should be electrically isolated from one another so that the use of one circuit does not interfere with the use of another.

Many types of signal-splitting circuits are available. One typical type of circuit is the so-called "hybrid circuit" in which the input R.F. signal is connected to the center tap of a signal dividing reactor. The outer ends of the reactor are then connected to respective terminals with a resistor connected across these respective terminals. This resistor provides the desired isolation impedance between the output terminals. A separate radio frequency power feedthrough choke is then connected to one terminal of the resistor to provide a path for D-C power for each of the output terminals receiving the split signal. This D-C power is required in order to operate subsequent amplifiers, or the like, which may be connected to the individual output terminals in cascade through transmission lines. If desired, more than two output terminals can be provided by a cascading system wherein the ends of the first signal-splitting reactor receiving the input signal at the center thereof are connected to additional signal-splitting reactors which are each associated with two output terminals.

Such hybrid couplers have the disadvantage of requiring properly terminated outputs, since the isolation between the output terminals deteriorates in the absence of proper termination. Moreover, this type of coupler is relatively expensive because of the large number of components which are required.

Resistive splitting circuits are also known wherein each output circuit leading from a common input point to a respective terminal is provided with a series connected resistor and radio frequency choke. The resistors are required to pass the R.F. power to the output terminals of the respective splitting circuits to provide isolation, while the chokes provide the path for the D-C or A-C power duplexed on the same input or output circuits. While the resistive split has the advantage over the hybrid-type coupler of providing good isolation even though the output terminals are not properly terminated and in that the circuit is less expensive than the hybrid-type coupler, the standard resistive split circuit causes relatively large D-C losses because of the resistors in each of the output lines.

In accordance with the present invention, a novel output splitter circuit is provided in which a ferrite-type resistor is connected in series in each of the output lines between their respective output terminals and common input terminal. The ferrite resistor is simply a ferrite tube surrounding a lead wire. Ferrite resistors of this type ar well known to the art, and have the property of having relatively no resistance to D-C or to low frequency (60 cycles) power, while offering a relatively high resistance at R.F. frequencies. Thus, devices of this type have been connected in the cathode heater circuit of an electron tube in order to permit the flow of D-C or low frequency heating current while offering a high impedance to R.F. frequencies which may appear in the heater circuit.

This characteristic of the ferrite resistor is taken advantage of in the present invention in a novel manner using the R.F. resistance characteristic to form the desired high R.F. resistance between each of the output circuits while using the low impedance D-C characteristic to permit passage of D-C power from the common input point to each of the output terminals. Thus, the novel splitter circuit has all of the advantages of the so-called "resistive splitter circuit" described above, and has the further advantage of eliminating the R.F. chokes which were previously required. Thus, the circuit can be made in a less expensive manner while having all of the desired electrical characteristics of the standard type of resistive splitting circuit.

Accordingly, a primary object of this invention is to provide a novel signal-splitter circuit of the resistive-type which does not require an R.F. choke in each of the output circuits.

A further object of this invention is to reduce the required number of components in a resistive splitter circuit.

A still further object of this invention is to us a ferrite resistor in each output circuit of a signal-splitter circuit which is required to pass both R.F. signals and D-C power to the output terminals of each of the individual branches of the circuit.

These and other objects of this invention will become apparent from the following description of the drawings in which:

FIG. 1 shows a master TV antenna system which can incorporate the present invention.

FIG. 2 shows a circuit diagram of the present invention for a two-way split.

FIG. 3 illustrates a modification of the circuit of FIG. 2 showing the use of ferrite resistors in a four-way split, and further illustrates the use of a ferrite resistor for Q adjustment.

FIG. 4 illustrates the use of ferrite resistors in accordance with the present invention for a passive four-way splitter circuit.

FIG. 5 shows a circuit diagram of the attenuation pad of FIG. 1.

Referring first to FIG. 1, there is shown a typical installation which could incorporate the present invention. Thus, a single VHF-UHF antenna 100 is connected as illustrated, whereby the R.F. output of the antenna 100 is superimposed in the D-C output of D-C power supply 101 through the duplexing circuit 102. The duplex output is then connected by a suitable coaxial line to amplifier 103, attenuating pad 104 (which can incorporate the present invention, as will be shown later) to a splitter amplifier 105. Splitter 105 can have any desired number of output circuits, four being shown for purposes of illustration in FIG. 1. Each of the output circuits may then be connected to individual jack outlets which can be connected to a television receiver, shown as jacks 106, 107, 108 and 109, for the four output circuits, respectively.

The branch including jacks 109 is shown as further extending to an additional series of outlets 110 through amplifier 111. Note that since there is D-C available at amplifier 111, it does not need a separate power supply.

FIG. 2 shows one embodiment of the splitter amplifier 105 in accordance with the invention. Thus, input jack-type terminal 10, of standard variety, receives the input line and the duplexed R.F. and D-C. It is desired that the R.F. signal be delivered through a suitable amplification stage, to be described, to split output terminals 12 and 13 along with the D-C power, where terminals 12 and 13 are output connectors mounted on the amplifier.

In order to avoid the need for providing separate D-C voltage sources at terminals 12 and 13, it is common practice to arrange the splitter circuit in such a manner that the D-C power at terminal 10 is connected to terminals 12 and 13. The signal applied to terminal 10 is amplified by any suitable type amplifier. By way of example, a transistor amplifier may be used which includes transistor 14 with suitable circuitry for driving and biasing transistor 14. This circuitry includes capacitor 15, potentiometer 16, coil 17, fixed resistor 18, fixed resistor 19, capacitor 20, capacitor 21, resistor 22, coil 23, capacitors 24 and 25, resistor 26, choke coil 27, and capacitors 28, 29 and 30. Choke coils 31 and 32 form a D-C by-pass circuit for bringing the D-C power from terminal 10 to junction point 33 which is a common point from which the split output circuits begin.

The first output circuit which includes terminal 12 has ferrite resistor 34 connected therein, while the second output circuit which includes terminal 13 has ferrite resistor 35 connected therein.

It will be apparent that the amplifier R.F. signal applied to terminal 10 will appear amplified at junction point 33. Moreover, D-C power from terminal 10 will also appear at junction point 33 so that both R.F. and D-C power can be applied to the two-way split output and to terminals 12 and 13.

Each of ferrite resistors 34 and 35 will exhibit a relatively high impedance to the R.F. signals coming from junction point 33 so that they act in the manner of the prior art high R.F. equivalent resistance in order to obtain isolation between output terminals 12 and 13. However, this same component, unlike the R.F. impedance, also permits the passage of D-C power without loss to the terminals 12 and 13. Note that in the prior art type of resistive split, both an R.F. choke and resistance were required in parallel where the R.F. impedance provided the required isolation impedance between the various output terminals of the splitter circuit, while the choke was required in order to permit passage of D-C power.

Good results have been obtained when the various components of FIG. 2 were as follows.

TABLE I

Transistor 14—Type A490
Capacitor 15—220 pf.
Potentiometer 16—560 ohms
Coil 17—12 turns, #22 wire, 0.125 I.D.
Resistors:
    18—220 ohms, ¼ watt
    19—2.7K, ¼ watt
Capacitors:
    20—33 pf.
    21—1.5 pf.
Resistor 22—2.7K, ¼ watt
Coil 23—3 turns, #22 wire, 0.125 I.D.
Capacitors:
    24—1000 pf.
    25—1000 pf.
Resistor 26—360 ohms, ¼ watt
Choke 27—40 turns, #32 wire, core wound
Capacitors:
    28—1000 pf.
    29—1.5 pf.
    30—220 pf.
Chokes:
    31—3 turns, #24 wire, core wound
    32—3 turns, #24 wire, core wound Resistors 34 and 35 were ferrite beads (two beads per output) type 5659065/3B, available from Ferroxcube Co., and each exhibits a resistance range of from 30 ohms to 40 ohms in a signal frequency range of from 20 mHz. to over 1000 mHz. Each bead will have a resistance value of about 30 ohms, and, where different resistance values are desired, longer or shorter beads, or series arranged beads may be used.

FIG. 3 illustrates the type circuit shown in FIG. 2 where similar numerals identify similar components, where, however, a four-way signal split is provided and where an additional ferrite resistor device is provided for the Q adjustment of transistor 14. Thus, in FIG. 3, additional output terminals 35a and 36 are provided along with terminals 12 and 13 previously shown in FIG. 2. It will be apparent that any desired number of terminals could be added.

Each of the terminals 35a and 36 are then associated with ferrite resistors 37 and 38, respectively, which operate in a manner identical to that of ferrite resistors 34 and 35.

FIG. 3 also illustrates an additional ferrite resistor 40 which is connected to the case of transistor 14 through a coil 41. This novel connection provides low Q case neutralization for the transistor 14. In FIG. 3, ferrite resistor 40 is selected for the desired Q. Coil 41 may be an eleven-turn winding of No. 22 wire having an internal diameter of about 0.125 inch. Obviously, the low Q case neutralization circuit of FIG. 3 could have been used in FIG. 2. Moreover, the use of the ferrite resistor in this novel manner has general application to low Q neutralization circuits.

While the circuits of FIGS. 2 and 3 have illustrated the invention in connection with an amplifier stage connected between the input signal and the splitter circuit, it will be apparent that the invention is equally applicable to a passive-type circuit. Thus, in FIG. 4, an input terminal 50 receives R.F. signals from some suitable source, which are superimposed on D-C or low A-C power. Both the R.F. signal and D-C power are then connected to the desired splitter circuit through capacitor 52, R.F. transformer 53, capacitor 54, capacitor 55 and the respective capacitors 56, 57, 58 and 59 of each of the four splitter circuits which contain isolated terminals 60, 61, 62 and 63, respectively.

In accordance with the invention, ferrite resistors 64, 65, 66 and 67 are connected in each of the branch circuits including terminals 60 to 63, respectively.

In the circuit of FIG. 4, capacitor 52 was 1 pf.; capacitor 55 was 4.7 pf.; and capacitors 56 to 59 were each 0.68 pf. Ferrite resistors 64 to 67 consisted of two series connected elements of the 5659065/3B type supplied by the Ferroxcube Co., and provided an R.F. resistance of about 60 ohms at 20–1000 mHz. The D-C voltage at terminal 50 with respect to ground was 17.5 volts D-C, and the R.F. signal connected to terminal 50 was the VHF/UHF signal which was pre-amplified at a master antenna of a master antenna system.

Referring now to FIG. 5, there is shown the use of the invention in connection with the attenuation pad 104 of FIG. 1. Such pads are desired to attenuate the UHF-VHF signals to prevent amplifier overload, and when used in this type system, must pass the D-C power. The pad of FIG. 5 consists of input and output terminals 80 and 81, ferrite resistors 82 and 83, resistors 84 and 85 and capacitor 86. When using the pad for 6.0 db attenuation, resistors 84 and 85 were 220 ohms and capacitor 86 was 1000 pf. ferrite resistors 82 and 83 were each 30 ohms. Obviously, the pad of FIG. 5 will serve as an attenuator and will also pass the D-C power (or low frequency A-C power) from terminal 80 to terminal 81.

Where other attenuations are desired, such as 3 db, resistors 84 and 85 are 430 ohms, and only one bead 82 is used. A 12 db attenuation is obtained by using four beads similar to beads 82 and 83, and by making resistors 84 and 85 120-ohm resistors.

Although this invention has been described with respect to particular embodiments, it should be understood that many variations and modifications will now be obvious to those skilled in the art, and, therefore, the scope of this invention is limited not by the specific disclosure herein but only by the appended claims.

The embodiments of the invention in which an exclusive privilege or property is claimed are defined as follows:

1. A signal splitter circuit for delivering a common radio frequency signal and a common D-C voltage to a plurality of radio frequency isolated terminals comprising a plurality of individual circuits each having one end thereof terminated by a common terminal; the other end of each of said plurality of individual circuits electrically connected to one another and to a common input conductor; and a ferrite resistor connected in series in each of said individual circuits.

2. The circuit of claim 1 wherein said ferrite resistor of each of said individual circuits is the sole impedance element connected between said one end and said other end of each of said individual circuits.

3. The circuit of claim 1 wherein said ferrite resistor has an impedance of about 60 ohms at a frequency greater than 20 mHz. per second and a substantially zero impedance to D-C power.

4. The circuit of claim 1 which further includes input terminal means connectable to a source of D-C power and to a source of radio frequency signals, and an amplifier means; said amplifier means connected between said input terminal and said common conductor and applying an amplifier signal to the signal at said input terminal to said common conductor; and D-C by-pass circuit means in parallel with said amplifier connecting said D-C source to said common conductor.

5. The circuit of claim 4 wherein said ferrite resistor has an impedance of about 60 ohms at a frequency greater than 20 mHz. per second and a substantially zero impedance to D-C power.

6. The circuit of claim 5 wherein said ferrite resistor of each of said individual circuits is the sole impedance element connected between said one end and said other end of each of said individual circuits.

7. In a master antenna system; an antenna, a D-C power supply, an attenuator pad having input and output terminals, a signal splitter circuit having an input terminal and a plurality of output terminals, and a plurality of output circuits extending from said plurality of output terminals of said signal splitter circuit; means for duplexing the output of said antenna and the D-C output of said D-C power supply; means for connecting said duplexed output to said input terminal of said attenuator pad; means for connecting said output of said attenuator pad to said input terminal of said signal splitter circuit; first ferrite resistor means in said attenuator pad connected between said input and output terminals thereof; and second ferrite resistor means connected between said input terminal of said signal splitter circuit and each of the output circuits thereof.

8. The system of claim 7 wherein said signal splitter circuit further includes amplifier means for amplifying said R.F. signal.

9. The system of claim 8 wherein said amplifier means includes a transistor having a casing; and third ferrite resistor means connected in series with an inductance coil and between said casing and ground to form a low Q case neutralization circuit.

10. A transistor amplifier including a transistor having emitter, collector and base terminals extending through a conductive case; respective circuit means connected to said emitter, collector and base terminals; at least one of said circuit means connected to ground means for said transistor amplifier; and a series connected inductance coil and ferrite resistor connected in series with one another and connected between said case and said ground means.

11. An attenuator circuit for attenuating an R.F. signal and passing D-C power comprising first terminal means, second terminal means, ferrite resistor means having first and second terminals connected directly to said first and second terminal means, respectively, and attenuator circuit means for attenuating R.F. connected in parallel with said ferrite resistor means.

12. The attenuator circuit of claim 11 wherein said attenuator circuit means includes first and second resistors connected in closed series relation with said ferrite resistor means and a capacitor connected from the junction of said first and second resistors to ground.

References Cited

UNITED STATES PATENTS

| | | | |
|---|---|---|---|
| 2,554,828 | 5/1951 | Jacobs | 330—151 |
| 2,757,244 | 7/1956 | Tomcik | 333—6 |
| 2,929,887 | 3/1960 | Stern | 330—27 |
| 2,973,490 | 2/1961 | Schlicke | 336—175 |
| 3,208,001 | 9/1965 | Minner | 330—27 |
| 3,435,358 | 3/1969 | Rheinfelder | 325—308 |
| 3,456,215 | 7/1969 | Denes | 33—81 |

ROBERT L. RICHARDSON, Primary Examiner

H. W. BRITTON, Assistant Examiner

U.S. Cl. X.R.

178—6; 330—151; 333—6; 336—175